Aug. 12, 1947.    G. J. MAYER    2,425,629
LUGGAGE CARRIER
Filed March 15, 1946

INVENTOR.
GEORGE J. MAYER
by Gerald P. Welch
ATTORNEY.

Patented Aug. 12, 1947

2,425,629

UNITED STATES PATENT OFFICE 2,425,629

LUGGAGE CARRIER

George J. Mayer, New Berlin, Wis.

Application March 15, 1946, Serial No. 654,614

4 Claims. (Cl. 224—29)

This invention relates to improvements in luggage carriers, and more particularly to a novel luggage carrier adapted for placement on the sill of the open window of a vehicle.

An object of the invention is to provide a device of the type which will have greater strength by reason of its construction than other devices of the type now in use.

Another object of the invention is to provide a device of superior torsional stability.

Another object of the invention is to provide a luggage carrier which can be quickly placed on a car or removed therefrom and which will not mar the car surface or finish.

Other and further objects of the invention will appear as the description proceeds, reference being had to the accompanying drawing, in which.

Figures 1, 2:
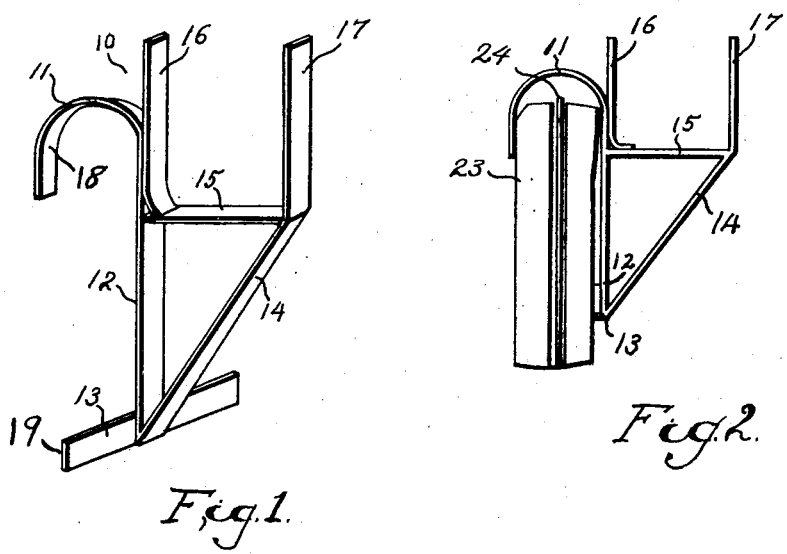
Fig. 1 is a view in perspective of a luggage carrier embodying my invention.
Fig. 2 is a fragmentary view in section of a vehicle door with the window lowered and a side view in elevation of a luggage carrier in position for use.
Figure 3:
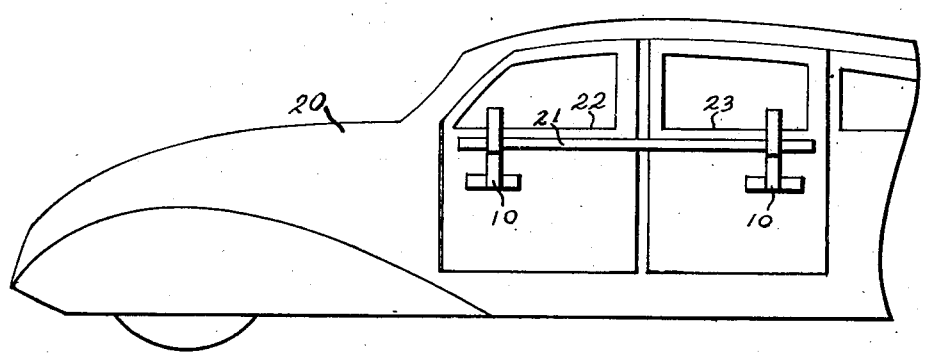
Fig. 3 is a side view in elevation of a vehicle with a pair of the luggage carriers applied thereto and in turn supporting a plank.

Referring more particularly to the drawing, the numeral 10 refers to the device generally, comprising a supporting hook 11, an integral vertical member 12, the torsional stabilizing element 13, the oblique support member 14, the horizontal support bar 15, and the vertical guards 16 and 17. The vertical guard 16 may be omitted with little loss of utility on the part of the device.

The inside portions of the supporting hook 11 are preferably faced with a resilient coating such as rubber as at 18, or the same may be provided with a cloth lining or other padding agency. The transversely disposed torsional stabilizing element 13 is also coated on the vehicle side at 19 with a resilient facing or may be faced with cloth or other padding.

In use, two luggage carriers 10 are employed, on the same side of a vehicle 20, by engaging them over the window sills in tandem, after the window panes have been lowered. A load of planks, pipe or similar articles may then be carried on the two support bars 15. The luggage carriers are preferably constructed of metal and by reason of their weight, the load and the rubber facings, they may be used with little danger of shifting position.

It will be understood that the device is capable of many modifications in structure and design, without departing from the spirit of the invention, within the scope of the appended claims.

Having thus described my invention, what I claim and desire to secure by Letters Patent of the United States, is:

1. A luggage carrier comprising a hooked element adapted to engage over the sill of a vehicle window, a vertically depending portion, a cross element affixed to the bottom thereof for bearing against the side of a vehicle, an element extending outwardly obliquely upwardly therefrom, a horizontal bar connecting the upper end of the oblique element with the depending portion, and a vertical bar extending upwardly from the juncture of the horizontal bar and said oblique element for retaining items of luggage placed on said horizontal bar.

2. A luggage carrier comprising a hooked element adapted to engage over the sill of a vehicle window, a vertically depending portion, a cross element affixed to the bottom thereof, an element extending outwardly obliquely upwardly therefrom, a horizontal bar connecting the oblique element with the depending portion, and a pair of vertical elements extending upwardly one from each end of the horizontal bar for retaining items of luggage on said bar therebetween.

3. A pair of luggage carriers adapted to be hooked over tandemly adjacent substantially aligned open windows of a vehicle, each comprising a hooked band of material, a horizontal element for carrying a load, a triangular formation of said band under and including said horizontal element, and a horizontal element extending laterally from the lower end of said triangular portion and lodged against said vehicle and cooperating with said hooked portion to restrain torsional movement of said carrier.

4. A unitary luggage carrier of flat metal band material throughout, including a hooked portion for engaging the sill of a vehicle window, a vertical portion depending integrally therefrom, a cross element at the bottom thereof adapted to rest against the vehicle side to prevent torsional twist of the carrier, a portion extending outwardly obliquely upwardly therefrom, a horizontal load-bearing portion connecting the upper end of the oblique portion with the depending portion, and a vertical member extending upwardly from the juncture of the horizontal portion and said oblique element.

GEORGE J. MAYER.

REFERENCES CITED

The following references are of record in the file of this patent:

UNITED STATES PATENTS

| Number | Name | Date |
|---|---|---|
| 1,778,771 | Prichard | Oct. 21, 1930 |
| 1,919,271 | Cady | July 25, 1933 |
| 1,970,962 | Hinckley | Aug. 21, 1934 |
| 2,157,001 | Morley | May 2, 1939 |
| 2,196,196 | Dorsey | Apr. 9, 1940 |
| 2,241,076 | Sundstrom | May 6, 1941 |
| 2,261,907 | Uecker et al. | Nov. 4, 1941 |
| 2,302,300 | Davies | Nov. 17, 1942 |